May 11, 1926.
R. SURRIDGE, JR
1,583,812
SOLE AND HEEL FOR BOOTS, SHOES, AND THE LIKE
Filed April 21, 1923
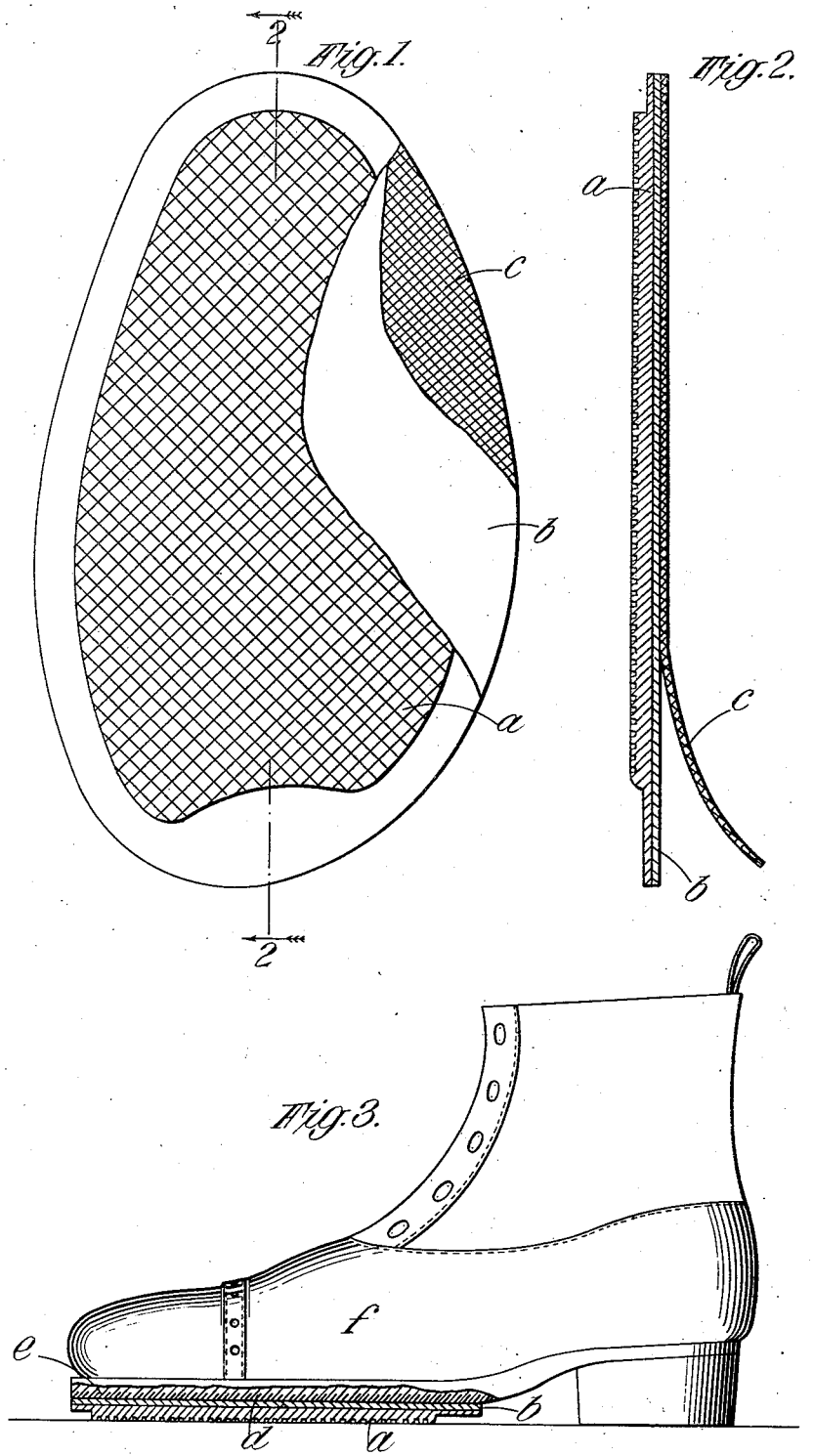
ROBERT SURRIDGE, JR., INVENTOR
BY *Hammond & Littell* ATTORNEYS Patented May 11, 1926.

1,583,812

UNITED STATES PATENT OFFICE.

ROBERT SURRIDGE, JR., OF LONDON, ENGLAND.

SOLE AND HEEL FOR BOOTS, SHOES, AND THE LIKE.

Application filed April 21, 1923. Serial No. 633,772.

This invention relates to rubber soles and heels of the kind which are caused to adhere to the existing, new or otherwise, leather, rubber, fabric or like soles and heels of footwear. Such soles and heels have been previously made of vulcanized rubber with a facing of pure rubber by which they have been attached to the existing soles of boots and shoes with a coating of rubber solution, but these soles and heels are subject to certain disadvantages. In addition it has been proposed to incorporate a vulcanizing agent such as sulphur in a rubber sole to be attached in the unvulcanized condition.

According to the present invention the surface or backing of the sole or heel is composed of pure rubber with an admixture of sulphur and carbon as vulcanizing agents, so that, in use, the heat of the foot of the wearer and the pressure due to his weight will gradually vulcanize said surface or backing which is thus caused to unite with the sole into a practically homogeneous mass.

One form of the invention in so far as it relates to rubber soles for boots is illustrated by the accompanying drawings of which Figure 1 is a face view of a sole before application to a boot, parts being broken away to illustrate the construction, Figure 2 is a section on the line 2—2 of Figure 1, the transverse dimensions being exaggerated for the sake of clearness, and Figure 3 is an elevation of a boot with an india rubber sole applied, the sole of the boot being shown partly in section.

As shown in the drawings and particularly in Figures 1 and 2, a rubber sole $a$ is moulded under pressure in the ordinary manner adopted in general rubber manufacture but having a cure which is known in the rubber trade as an "under cure". This "under cure" leaves the vulcanized rubber sole $a$ in such a state that when the backing $b$ is applied to said sole $a$ it combines with the sole $a$ to form one solid mass. This backing $b$ consists of pure rubber, a small percentage of sulphur (about 10%) and some carbon (about 1%) or other known substance which will assist said pure rubber to vulcanize. The backing compound is prepared in any usual mixing machine and is then passed through a calendering machine on to a linen fabric $c$ so as to form a layer on said fabric $c$, of convenient thickness, preferably about $\frac{1}{100}''$ thick. As an alternative the compound $b$ may be spread on to the linen $c$ in the form of solution.

The vulcanized rubber sole $a$ is now fixed to the layer of backing compound $b$ by first roughing the surface of said vulcanized rubber sole $a$ by any known means and applying two thin coats of rubber solution to said sole $a$, (allowing the first to dry before applying the second) and, then, when the second coat is dry placing the vulcanized rubber sole $a$ on the backing compound $b$ so that the rubber left from the rubber solution, from which the solvents have now evaporated, is in contact with the surface of said backing $b$, when said vulcanized sole $a$ will amalgamate with the backing $b$ to form a solid mass, as hereinbefore mentioned, so that said backing compound $b$ becomes part of said vulcanized rubber sole $a$.

To attach the rubber sole $a\,b$ to the sole $e$ of a boot $f$ (see Figure 3), the boot sole $e$ is roughened by any known means and two coats of a solution, which consists of hard Pará rubber broken in a solvent which is made up of equal proportions of carbon-tetrachloride and trichlorethylene, are brushed into the roughened surface, the first coat being allowed to dry in before the second is applied; a single coat of said solution is also given to the backing $b$ of the rubber sole after the linen fabric $c$ has been stripped therefrom, as indicated in Figure 2. The action of this solution is different to that of other rubber solutions inasmuch as all solvents of a petroleum nature penetrate leather when applied thereto and dry on the under side leaving rubber on the surface, whereas in the solution above mentioned the solvents do not soak into the leather but have an opposite effect in that they evaporate upwards and dry rapidly, and so allow the rubber to sink into the boot sole $e$ as shown at $d$. When the solvents have dried off, upwards as hereinbefore mentioned, the improved sole $a\,b$ is applied to the sole $e$ of the boot $f$ and a strong adhesion is set up between the rubber $b$ and the leather $d$ which draws the rubber sole $a\,b$ tightly on to the leather $d$ and thus obviates the use of external pressure to make certain of a firm combination of the two.

The boot or shoe may be worn immediately the sole has been applied.

While the rubber sole $a$ $b$ is in use the weight of the wearer and the natural warmth of his feet act upon the backing compound $b$ between the vulcanized rubber sole $a$ and the existing sole $e$ of the boot $f$, causing a slow "curing" action to take place which gradually welds the rubber sole $a$ $b$ to the leather $d$ so that a solid sole $a$ $b$ of vulcanized rubber results which forms with the existing sole $e$ one solid sole having a lower portion or wearing surface of vulcanized rubber.

I claim:—

1. The method of attaching a rubber sole to a leather shoe or the like, which comprises applying a cement solution consisting of rubber, carbon tetrachloride and trichlorethylene to the leather sole and to a vulcanizable surface of the rubber sole, allowing the cement to dry, pressing the so treated surfaces together, and permitting the heat and pressure from the wearer's foot to permanently vulcanize the rubber sole to the shoe.

2. The method of attaching an india rubber tread sole to the ordinary leather sole of a boot consisting in moulding a rubber sole under pressure, vulcanizing said sole to the state of under cure, applying to said sole a backing of pure rubber containing an admixture of sulphur and carbon, roughening the surface of the leather sole and applying to the roughened surface and to said backing a solution of hard Pará rubber in equal parts of carbon tetrachloride and trichlorethylene, allowing the solvents to dry off and pressing the treated surfaces together.

ROBERT SURRIDGE, JUNR.